United States Patent
Derriey et al.

(10) Patent No.: US 10,088,805 B2
(45) Date of Patent: *Oct. 2, 2018

(54) TECHNICAL OR DECORATIVE PIECE ASSOCIATING A TRANSPARENT MATERIAL AND A SILICON BASED AMORPHOUS MATERIAL AND METHOD OF MANUFACTURING THE SAME

(71) Applicant: The Swatch Group Research and Development Ltd, Marin (CH)

(72) Inventors: Gilles Derriey, Morteau (FR); Christian Verdon, Boussens (CH); Stewes Bourban, Ecublens (CH); Giancarlo Poli, les Geneveys-sur-Coffrane (CH)

(73) Assignee: The Swatch Group Research and Development, Ltd., Marin (CH)

( * ) Notice: Subject to any disclaimer, the term of this patent is extended or adjusted under 35 U.S.C. 154(b) by 646 days.

This patent is subject to a terminal disclaimer.

(21) Appl. No.: 14/547,978

(22) Filed: Nov. 19, 2014

(65) Prior Publication Data
US 2015/0146504 A1    May 28, 2015

Related U.S. Application Data

(62) Division of application No. 11/917,677, filed as application No. PCT/EP2006/005227 on Jun. 1, 2006, now Pat. No. 8,964,513.

(30) Foreign Application Priority Data

Jun. 14, 2005 (EP) ..................................... 05012785
Apr. 3, 2006 (CH) ..................................... 0552/06

(51) Int. Cl.
*G04B 37/22*    (2006.01)
*C03C 17/04*    (2006.01)
(Continued)

(52) U.S. Cl.
CPC .............. *G04B 37/22* (2013.01); *C03C 17/04* (2013.01); *G04B 19/065* (2013.01); *G04B 19/12* (2013.01);
(Continued)

(58) Field of Classification Search
CPC .............................. G04B 19/12; G04B 19/06
See application file for complete search history.

(56) References Cited

U.S. PATENT DOCUMENTS 2,151,600 A * 3/1939 Janzen .................... G09F 13/00
                                                      40/433
4,435,090 A    3/1984 Jaccard
(Continued)

FOREIGN PATENT DOCUMENTS

CH          28539          7/1903
CH       690 518 A5     9/2000
(Continued)

OTHER PUBLICATIONS

"Gemstone Cuts" acquired from https://www.jewelsforme.com/gem_and_jewelry_library/gemstone_cuts on Nov. 5, 2017.*
(Continued)

*Primary Examiner* — Gerard T Higgins
(74) *Attorney, Agent, or Firm* — Oblon, McClelland, Maier & Neustadt, L.L.P.

(57) ABSTRACT

A transparent substrate made of a transparent material resistant to temperatures higher than 500° C., such as sapphire, includes recesses in at least one of its faces and/or a groove machined into its thickness, that are covered with opaque, translucent or transparent enamel depositions that may or may not be colored, depending upon the pigments used in the enamel composition.

19 Claims, 3 Drawing Sheets

(51) Int. Cl.
*G04B 19/06* (2006.01)
*G04B 19/12* (2006.01)

(52) U.S. Cl.
CPC ............. *Y10T 428/24612* (2015.01); *Y10T 428/24752* (2015.01)

(56) References Cited

U.S. PATENT DOCUMENTS

| | | | |
|---|---|---|---|
| 4,534,660 | A | 8/1985 | Laesser |
| 4,599,251 | A | 7/1986 | Feller |
| 4,623,262 | A | 11/1986 | Gogniat et al. |
| 4,809,417 | A | 3/1989 | Normann, Jr. |
| 5,409,742 | A | 4/1995 | Arfsten et al. |
| 5,618,585 | A | 4/1997 | Hechler et al. |
| 5,760,367 | A | 6/1998 | Rosenwasser et al. |
| 6,207,285 | B1 | 3/2001 | Sakoske et al. |
| 6,525,300 | B1 | 2/2003 | Mitra et al. |
| 6,662,716 | B2 | 12/2003 | Benderly |
| 7,332,210 | B2 | 2/2008 | Arms et al. |
| 8,596,860 | B2 | 12/2013 | Verdon et al. |
| 2001/0014618 | A1 | 8/2001 | Martin et al. |
| 2002/0184920 | A1 | 12/2002 | Fossaluzza |
| 2005/0202218 | A1 | 9/2005 | Arms et al. |
| 2006/0062971 | A1 | 3/2006 | Bourban et al. |

FOREIGN PATENT DOCUMENTS

| | | |
|---|---|---|
| FR | 2 750 419 | 1/1998 |
| FR | 2 857 007 | 1/2005 |
| GB | 2032657 | 5/1980 |
| JP | 53053360 | 5/1978 |
| KR | 20010096049 A * | 11/2001 |

OTHER PUBLICATIONS

"Light Sources in Electronics" from Apr. 7, 2005, as acquired from Wayback Machine at https://web.archive.org/web/20050407114016/ http://hyperphysics.phy-astr.gsu.edu/hbase/Electronic/leds.html.*
Patent abstracts of Japan, vol. 0002, No. 090 (E-045) Jul. 22, 1978 (Intl Search Report—NPL01 in IDS filed Feb. 5, 2015. See also FR04 for full citation of JP document).
International Search Report issued in corresponding application No. PCT/EP2006/005227, completed Aug. 3, 2006 and dated Aug. 10, 2006.
"Inclined," The American Heritage College Dictionary 687 (3d. Ed. 1993).

* cited by examiner

TECHNICAL OR DECORATIVE PIECE ASSOCIATING A TRANSPARENT MATERIAL AND A SILICON BASED AMORPHOUS MATERIAL AND METHOD OF MANUFACTURING THE SAME

This is a Continuation Application of application Ser. No. 11/917,677, filed Dec. 14, 2007, which is the National Phase Application in the United States of International Patent Application No. PCT/EP2006/005227, filed Jun. 1, 2006, which claims priority on European Patent Application No. 05012785.1, filed Jun. 14, 2005 and Swiss Patent Application No. 00552/06, filed Apr. 3, 2006. The entire disclosures of the above patent applications are hereby incorporated by reference.

FIELD OF THE INVENTION

The present invention concerns a technical or decorative piece associating a transparent material resistant to temperatures higher than 500° C. and a silicon based material. It concerns more particularly a piece of this type including enamel depositions. The invention will be illustrated by way of example by a timepiece whose aesthetic appearance can be altered, and/or which could be structured to make parts of the movement or data displayed under the dial visible.

BACKGROUND OF THE INVENTION

Watches with mechanical movements, called "skeleton-watches", have been known for a long time. A Swiss Patent No. CH 28539 discloses a watch wherein the dial is made of a transparent material, such as glass, mica, or celluloid and allows the mechanism of the movement, and the plates and metal bridges to be seen. The hour symbols are added by any means to the visible surface of the dial. U.S. Pat. No. 4,534,660 and CH Patent No. 690 518 disclose even more "skeletal" watches. In U.S. Pat. No. 4,534,660, the top plate forming the crystal, the plates and the bridges, and the bottom plate form a pile made of a crystalline material, such as sapphire, said plates being machined with apertures or recesses for housing the parts of the movement, so as to make the entire watch mechanism visible. CH Patent No. 690 518 has the same objective, but with a single-piece transparent assembly cage made by ultrasound machining using a sonotrode. This latter document advises affixing the time symbols to the bezel to increase the aesthetic effect.

Between the oldest prior art where the dial is entirely opaque and the aforecited prior art where it is entirely transparent, with the exception of a few marking zones, there are no intermediate solutions for having quite wide opaque zones and complementary transparent zones or vice versa. The teaching of this prior art does not allow shades of colour to be created at the surface of the dial either.

SUMMARY OF THE INVENTION

It is therefore an object of the present invention to overcome the drawbacks of the aforecited prior art by providing a piece in which the association to two materials that have, to the best of the Applicant's knowledge, never been used together to produce a technical result or decorative effect, able to create transparent, opaque or translucent zones that may or may not be coloured.

The invention therefore concerns a piece for technical and/or decorative use, including a transparent substrate resistant to temperatures higher than 500° C. and including opaque, translucent or transparent depositions that may or may not be coloured, said depositions being formed by layers of enamel.

The transparent material resistant to temperatures higher than 500° C. may be a mono or polycrystalline material, for example a quartz, spinelle or corundum, particularly sapphire. An amorphous material can also be used, such as a mineral glass, provided that its softening point is higher than the temperature necessary for carrying out the enamel deposition.

According to another feature of the invention, the layers of enamel are deposited in recesses machined in at least one face of the substrate, the parts that do not have recesses also being able to be covered with enamel layers, or conversely, left bare, and thus transparent.

According to another feature of the invention, the enamel depositions are carried out in a groove machined into the thickness of the transparent substrate.

According to yet another feature of the invention, the enamel layers can be thick, or, conversely, thin or ultra thin and translucent, or even transparent, or opaque depending upon the pigments in the enamel composition.

According to yet other features of the invention, enamel layers of different colours can also be provided in the two faces of the transparent substrate or even in the groove. When the layers are translucent and have overlapping zones, this allows an additional colour or shade to be obtained.

BRIEF DESCRIPTION OF THE DRAWINGS

Other features and advantages of the present invention will appear more clearly in the following description of several embodiments, given by way of non-limiting illustration, with reference to the drawings, in which.

DETAILED DESCRIPTION OF THE INVENTION

Figure 1:
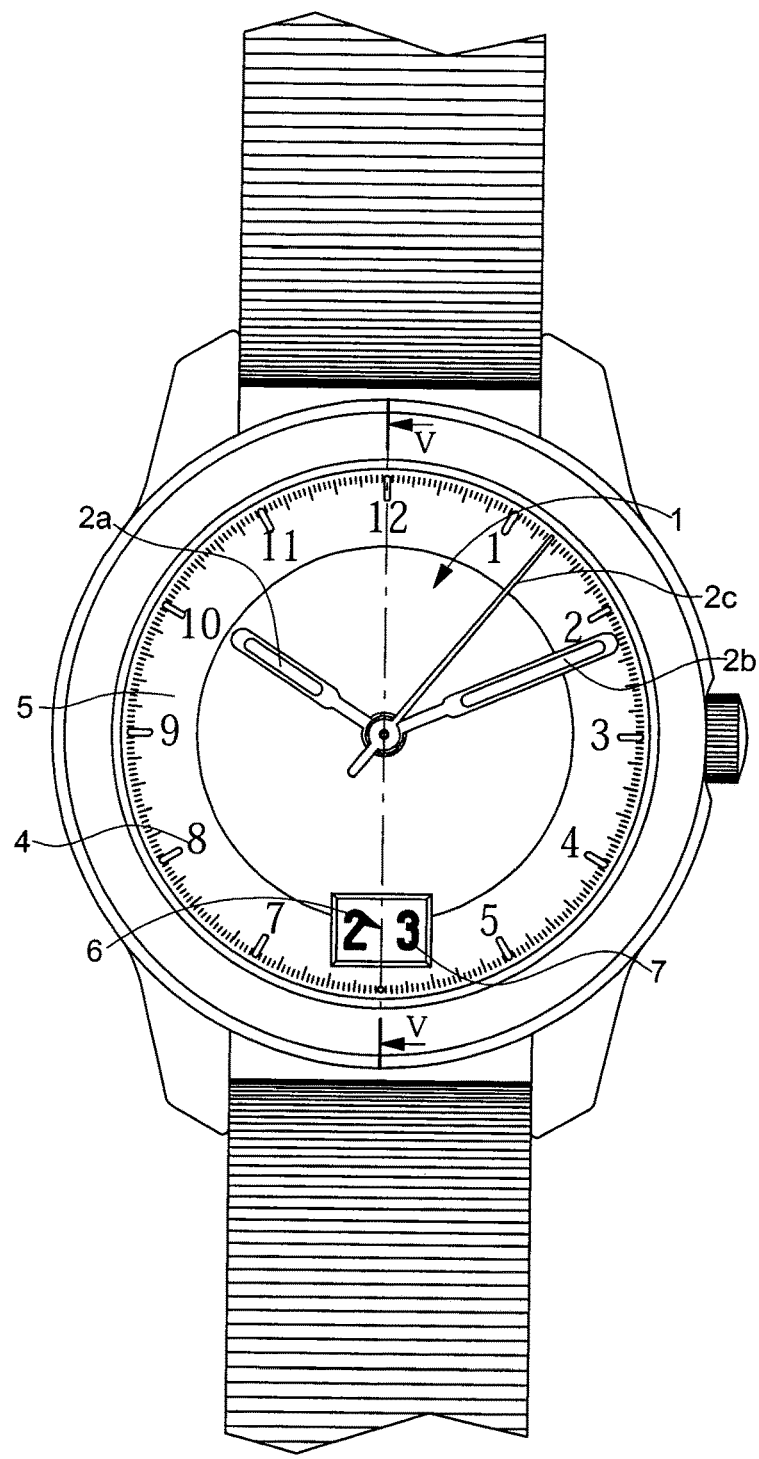
FIG. 1 shows a top view of a wristwatch incorporating a decorative and technical piece according to the invention.

With reference first of all to FIGS. 1 to 5, a first embodiment of a piece according to the invention will be described used to form the dial 1 of a wristwatch with an analogue display by means of hour hand 2a, minute hand 2b and second hand 2c moving opposite hour symbols 4 marked on an hour circle 5. In the example shown, dial 1 includes an aperture 6 passing through the entire thickness of dial 1 and below which there moves a date disc 7.

Figure 4:
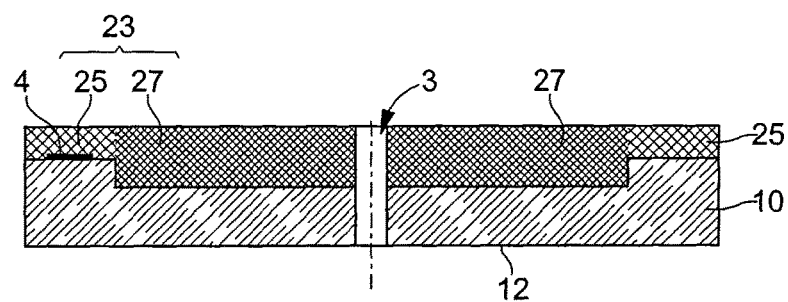

Dial 1 is shown in cross-section in FIG. 4 along the 6 o'clock-12 o'clock line, the scale along the thickness being greatly exaggerated for better comprehension of the drawings. The dial is formed by a transparent substrate 10 having a top face 11 oriented towards an observer, the bottom face being designated by the reference 12.

Figure 2:
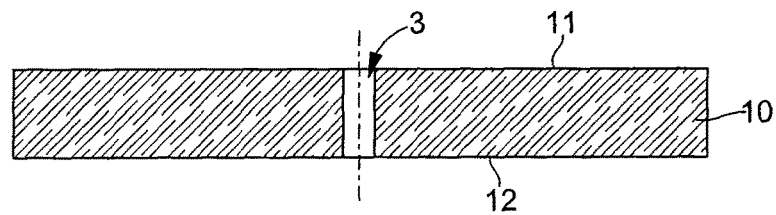
FIGS. 2 to 5 show different steps of a first embodiment along the cross-section IV-IV of FIG. 1.

Transparent substrate 10 shown in FIG. 2 is cut to the dimensions of the dial in a plate whose thickness is comprised between 0.4 and 0.9 mm, the material forming said plate being able to resist temperatures higher than 500° C., preferably temperatures comprised between 700° C. and 1300° C. Substrate 10 is pierced at its centre with a hole 3 for the passage of the pipes of hands 2a, 2b, 2c, by known means, for example using a grinding wheel or via ultrasounds with a sonotrode. Equally, the hole could be made in a last manufacturing step of the dial.

Figure 3:
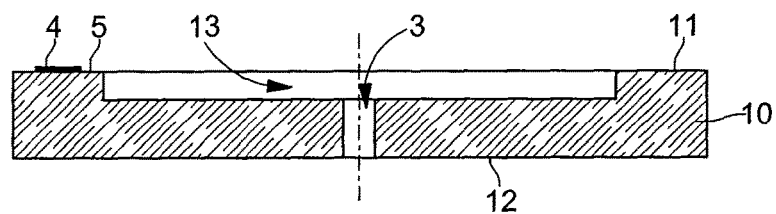

As shown in FIG. 3, a recess 13 corresponding to the disc located inside hour circle 5, is machined in the top face 11 of transparent substrate 10, said recess having for example a depth of 0.2 mm. In the case of a transparent substrate 10 made of sapphire, recess 13 is made by mechanical abrasion (spot facing or etching) with diamondized tools. Depending upon the nature of transparent substrate 10, other machining methods are possible. For example, with a quartz substrate, photochemical machining could be carried out.

As can be seen in FIG. 4, hour circle 5 and recess 13 are covered with enamel layers 23. These enamel layers 23 are obtained by known techniques including several steps consisting of dipping, spraying, fine finishing or screen printing to apply a determined enamel composition, and passing into the furnace after each step in order to obtained the desired thickness. The firing temperature is comprised between 700° C. and 1300° C. depending upon the nature of the enamel composition. In order to prevent a depression in the enamel layers where pipe hole 3 is located, it is possible to provide a provisional heat resistant insert (not shown), for example a ceramic insert, said insert then being removed in the finishing step. The finishing step consists in polishing the two faces with a grinding wheel or a fine grain sandpaper (9 to 15 μm) to attain the desired dimensions, then final firing in the furnace to obtain a glazed finish of the enamelled surface.

As can be seen, the layers of enamel 27 located at the centre of the dial are thick, for example 0.4 mm, and can be opaque to light depending upon the pigments in the enamel composition. The hue visible to the observer will thus be that of the enamel. However the enamel layers 25 on the hour circle are thin and sufficiently thin, for example 0.2 mm, for them to be translucent and to enable the subjacent substrate to be seen. If desired, the subjacent substrate can include markings or decorations, such as the hour symbols 4, formed for example by metallizing, prior to the steps for forming the enamel layers. The thin, translucent enamel layer 25 thus enables the indications carried by the hour circle to be read on a background that corresponds to the hue chosen for the enamel. It is of course possible, as has been known for a long time, to affix markings or decorations to the surface of the enamel, or to combine the two possibilities in order to increase the aesthetic choices.

It will also be observed that the same piece manufactured as indicated hereinbefore can present two different aspects to the observer depending upon the way in which dial 1 is mounted in the case. If enamelled face 11 is oriented on the side of the observer, the appearance of opaque zone 27 and translucent zone 25 will be brilliant. If, conversely, the non-enamelled face 12 is oriented on the observer's side, the interface between transparent substrate 10 and layers of enamel 25, 27 will give a more granular appearance. Thus, with the same dial manufacturing line, the invention allows two different collections of wristwatches to be produced.

Figure 5:
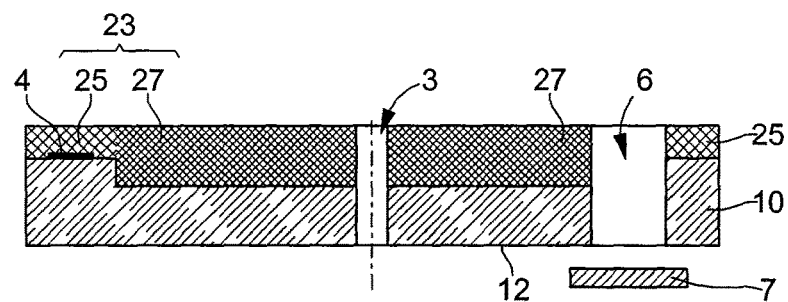

Once the dial is finished, or before the last firing for the glazed finish, it is possible, as shown in FIG. 5, to cut a large through passage forming aperture 6, to make the data carried by date disc 7, or any other support, visible.

Figure 6:
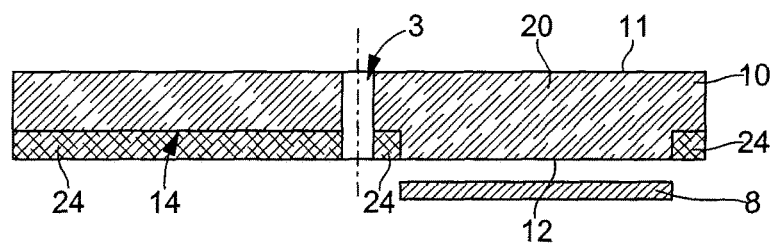
FIG. 6 shows a cross-section of a second embodiment.

With reference now to FIG. 6, a second embodiment is shown in cross-section, which differs from the preceding embodiment in that the transparent monocrystalline substrate 10 is machined on face 12 opposite the face directly visible to an observer. Zones 14 are machined hollow and filled with enamel layers to form a thick opaque layer 24 that does not exceed the hollow machined parts, thus leaving zones 20 free of any enamel coating and thus totally transparent. The contour of these transparent zones 20 can be such that a part of the mechanism, such as a tourbillon schematically represented by the reference 8, is visible.

Figure 7:
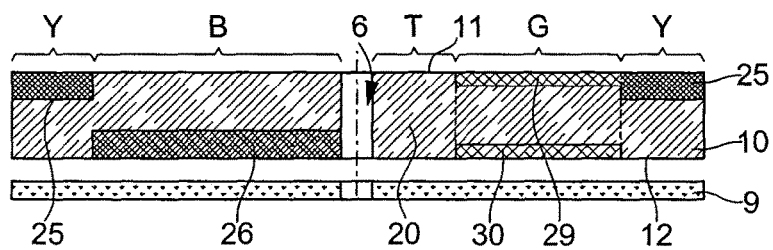
FIG. 7 shows a cross-section of a third embodiment.

FIG. 7 shows a third embodiment which is a kind of synthesis of the previously described embodiments and which includes back lighting symbolised by an electroluminescent sheet 9, the top face 11 oriented towards an observer, is machined hollow to allow the deposition of thin enamel layers 25 and the deposition of ultra-thin enamel layers 29, for example 0.1 mm. Certain zones of top surface 11 are free of enamel depositions and it is assumed that the enamel used has a first colour, for example yellow (Y). The bottom face 12 is also hollow machined to allow depositions of thin enamel 26 and ultra-thin layers 30, the enamel used having a second colour, for example blue (8). In the part located to the left of hand hole 3, the top and bottom enamelled zones 25 and 26 are juxtaposed and the colours visible to an observer will be yellow (Y) and blue (B), The part located to the right of hand hole 3 includes one entirely transparent zone, one zone where top and bottom ultra thin layers 29 and 30 are superposed to give, via a mixture of the two primary colours, the colour green (G), and one zone of the top surface where ultra thin enamel deposition layer 29 is contiguous with thin enamel deposition layer 25.

Figure 8:
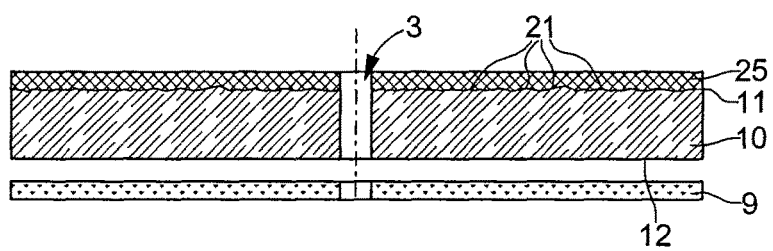
FIG. 8 shows a cross-section of a fourth embodiment.

For better comprehension of the drawings, the thin and ultra thin enamel depositions have been shown with a constant thickness, i.e. with recesses having a bottom parallel to the surfaces of transparent substrate 10. It is clear that there is no technical difficulty in making the bottoms of the recesses with an inclined surface that gradually varies the thickness of the enamel layers. This embodiment, which is not shown, allows hues of the same colour or a gradual change between two different colours when enamel depositions are carried out on both faces of the transparent substrate and have overlapping zones. Likewise, and particularly when one face includes disjointed recesses, it is possible to have more than one enamel colour on the same face, or to create a partitioned enamelled area. FIG. 8 illustrates a fourth embodiment, which can also be combined with the preceding embodiments. In this embodiment, one of the surfaces, top surface 11, has laser structuring 21 forming a hologram, then it is coated with thin enamel layers, said hologram being able to be observed via reflection or transmission if back lighting 9 is provided.

The wristwatch dial has been given solely by way of example, since the use of a piece made according to the invention is not limited to the field of watchmaking. This type of piece can be incorporated in any type of case for which an at least partially transparent panel is desired. It can for example form the fastening glass of the lid of a jewellery box.

Figure 9:
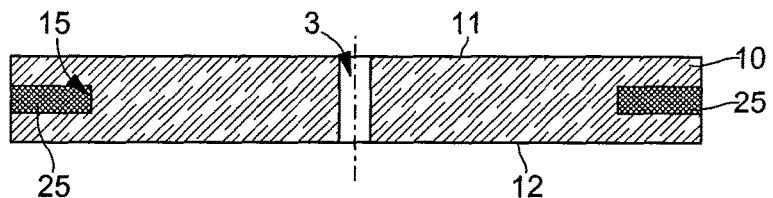
FIG. 9 shows a cross-section of a fifth embodiment.

According to the fifth embodiment shown in FIG. 9, the enamel deposition 25 is carried out in a groove 15 machined in the thickness of the transparent substrate 10, in accordance with the techniques indicated hereinabove. This embodiment has the advantage of making porosity in the enamel mass invisible, so as to facilitate machining and polishing operations, including around the opening of groove 15.

This embodiment can advantageously be combined with the previously described embodiments. The enamel deposited in the groove can for example have a first shade and coincide with the hour circle and recesses, formed on the back face of the dial at the 3 o'clock, 6 o'clock, 9 o'clock and 12 o'clock positions, can be covered with an enamel of a second shade in order to make these time positions more visible.

The invention claimed is:

1. A piece for technical use or decorative use or technical and decorative use, comprising:
   a transparent substrate having a top face, a bottom face, and a thickness; and
   a deposit that is layered in at least one layer of enamel, the at least one layer of enamel is on the top face, on the bottom face, or in the thickness of the transparent substrate, and the at least one layer of enamel was formed by depositing at least one enamel material,
   wherein the at least one layer of enamel is in at least one recess machined in the top face, at least one recess machined in the bottom face, or at least one groove machined in the thickness of the transparent substrate,
   wherein the at least one enamel material is opaque, translucent, or transparent, and the at least one enamel material may or may not be colored,
   wherein the transparent substrate is a material that is resistant to temperatures that are higher than 500° C. and not higher than 1300° C.,
   wherein the at least one layer of enamel includes an opaque or translucent layer of enamel,
   wherein the at least one layer of enamel includes a first layer of enamel on the bottom face of the transparent substrate, opposite the top face, and
   wherein the piece is a dial of a timepiece.

2. The piece according to claim 1, wherein the transparent substrate is a material that is resistant to temperatures between 700° C. and 1300° C.

3. The piece according to claim 1, wherein the transparent substrate includes a monocrystalline or polycrystalline material.

4. The piece according to claim 3, wherein the monocrystalline or polycrystalline material includes quartz, spinelle, or corundum.

5. The piece according to claim 3, wherein the monocrystalline or polycrystalline material includes corundum, and the corundum is sapphire.

6. The piece according to claim 1, wherein the transparent substrate includes an amorphous material.

7. The piece according to claim 6, wherein the amorphous material is mineral glass.

8. The piece according to claim 1, wherein the at least one enamel material that forms the deposit is fired and glazed in a furnace.

9. A piece for technical use or decorative use or technical and decorative use, comprising:
   a transparent substrate having a top face, a bottom face, and a thickness; and
   a deposit that is layered in at least one layer of enamel, the at least one layer of enamel is on the top face, on the bottom face, or in the thickness of the transparent substrate, and the at least one layer of enamel was formed by depositing at least one enamel material,
   wherein the at least one layer of enamel is in at least one recess machined in the top face, at least one recess machined in the bottom face, or at least one groove machined in the thickness of the transparent substrate,
   wherein the at least one enamel material is opaque, translucent, or transparent, and the at least one enamel material may or may not be colored,
   wherein the transparent substrate is a material that is resistant to temperatures that are higher than 500° C. and not higher than 1300° C.,
   wherein the at least one layer of enamel includes an opaque or translucent layer of enamel,
   wherein the at least one layer of enamel includes a first layer of enamel on the top face and a second layer of enamel on the bottom face of the transparent substrate, and
   wherein the piece is a dial of a timepiece.

10. The piece according to claim 9, wherein the first layer of enamel on the top face that is a visible face and the second layer of enamel that is on the bottom face that is an opposite face occupy complementary zones.

11. The piece according to claim 10, wherein the first layer of enamel on the top face has a different shade to that of the second layer of enamel that is on the bottom face.

12. The piece according to claim 9, wherein the first layer of enamel on the top face that is a visible face and the second layer of enamel that is on the bottom face that is an opposite face are overlapping.

13. The piece according to claim 12, wherein the first layer of enamel on the top face has a different shade to that of the second layer of enamel that is on the bottom face.

14. The piece according to claim 9, wherein the transparent substrate is a material that is resistant to temperatures between 700° C. and 1300° C.

15. A piece for technical use or decorative use or technical and decorative use, comprising:
   a transparent substrate having a top face, a bottom face, and a thickness; and
   a deposit that is layered in at least one layer of enamel, the at least one layer of enamel is on the top face, on the bottom face, or in the thickness of the transparent substrate, and the at least one layer of enamel was formed by depositing at least one enamel material,
   wherein the at least one layer of enamel is in at least one recess machined in the top face, at least one recess machined in the bottom face, or at least one groove machined in the thickness of the transparent substrate,
   wherein the at least one enamel material is opaque, translucent, or transparent, and the at least one enamel material may or may not be colored,
   wherein the transparent substrate is a material that is resistant to temperatures that are higher than 500° C. and not higher than 1300° C.,
   wherein the at least one layer of enamel includes an opaque or translucent layer of enamel,
   wherein the piece further comprises back lighting, and
   wherein the piece is a dial of a timepiece.

16. The piece according to claim 15, wherein the back lighting includes diodes or light emitting elements.

17. The piece according to claim 15, wherein the transparent substrate is a material that is resistant to temperatures between 700° C. and 1300° C.

18. A piece for technical use or decorative use or technical and decorative use, comprising:
   a transparent substrate having a top face, a bottom face, and a thickness; and
   a deposit that is layered in at least one layer of enamel, the at least one layer of enamel is on the top face, on the bottom face, or in the thickness of the transparent substrate, and the at least one layer of enamel was formed by depositing at least one enamel material,
   wherein the at least one layer of enamel is in at least one recess machined in the top face, at least one recess machined in the bottom face, or at least one groove machined in the thickness of the transparent substrate, wherein the at least one enamel material is opaque, translucent, or transparent, and the at least one enamel material may or may not be colored, wherein the transparent substrate is a material that is resistant to temperatures that are higher than 500° C. and not higher than 1300° C., wherein the at least one layer of enamel includes an opaque or translucent layer of enamel, and wherein the top face of the transparent substrate has been structured and coated with translucent enamel layers to form a hologram.

19. The piece according to claim 18, wherein the transparent substrate is a material that is resistant to temperatures between 700° C. and 1300° C.

* * * * *